US009894145B2

(12) United States Patent
Dawson et al.

(10) Patent No.: US 9,894,145 B2
(45) Date of Patent: *Feb. 13, 2018

(54) METHOD AND SYSTEM FOR FILTERING MOVEMENTS BETWEEN VIRTUAL ENVIRONMENTS

(71) Applicant: International Business Machines Corporation, Armonk, NY (US)

(72) Inventors: Christopher J. Dawson, Arlington, VA (US); Barry M. Graham, Silver Spring, MD (US); Rick A. Hamilton, II, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/480,928

(22) Filed: Sep. 9, 2014

(65) Prior Publication Data

US 2014/0379752 A1 Dec. 25, 2014

Related U.S. Application Data

(63) Continuation of application No. 12/549,567, filed on Aug. 28, 2009, now Pat. No. 8,300,804.

(51) Int. Cl.
| | |
|---|---|
| *G06F 3/048* | (2013.01) |
| *G06F 3/00* | (2006.01) |
| *G06F 15/16* | (2006.01) |
| *H04L 29/08* | (2006.01) |
| *H04M 1/02* | (2006.01) |

(Continued)

(52) U.S. Cl.
CPC .......... *H04L 67/10* (2013.01); *H04M 1/0297* (2013.01); *A63F 2300/5553* (2013.01); *G06F 3/04815* (2013.01); *G06Q 30/02* (2013.01)

(58) Field of Classification Search
CPC ................. G06F 3/04815; H04L 67/38; A63F 2300/5553
See application file for complete search history.

(56) References Cited

U.S. PATENT DOCUMENTS

| | | |
|---|---|---|
| 5,737,533 A | 4/1998 | de Hond |
| 5,982,372 A | 11/1999 | Brush, II et al. |

(Continued)

OTHER PUBLICATIONS

Robbins et al.; "Second Life® for Dummies®", Wiley Publishing, Inc., Jan. 15, 2008, all pages.

*Primary Examiner* — Jordany Nunez
(74) *Attorney, Agent, or Firm* — Whitham, Curtis & Cook, PC; Maeve M. Carpenter

(57) ABSTRACT

In response to a teleport request, teleport destination characteristics are determined and compared against preferences, characteristics and restrictions of an avatar as indicated by metadata or tags to determine if the teleport destination is suitable for teleportation of that avatar. If the destination is found unsuitable, a search is conducted, preferably based on unmatched metadata of the avatar or the destination to suggest or directly substitute a suitable teleportation destination. Metadata for the avatar and the destination can include metadata which is dynamic (such as destination occupancy or processing capacity) adaptively developed or based on current or historical usage and virtual universe system status.

7 Claims, 6 Drawing Sheets

(51) Int. Cl.
  *G06F 3/0481* (2013.01)
  *G06Q 30/02* (2012.01)

(56) References Cited

U.S. PATENT DOCUMENTS

| | | |
|---|---|---|
| 6,219,045 B1 | 4/2001 | Leahy et al. |
| 6,271,843 B1 | 8/2001 | Lection et al. |
| 6,931,254 B1 | 8/2005 | Egner et al. |
| 7,269,632 B2 | 9/2007 | Edeker et al. |
| 2004/0168121 A1 | 8/2004 | Matz |
| 2008/0215994 A1 | 9/2008 | Harrison et al. |
| 2009/0132403 A1 | 5/2009 | Titus et al. |
| 2009/0158170 A1 | 6/2009 | Narayanan et al. |
| 2009/0228355 A1* | 9/2009 | Dawson ............... A63F 13/12 705/14.73 |
| 2010/0332998 A1 | 12/2010 | Sun |

* cited by examiner

METHOD AND SYSTEM FOR FILTERING MOVEMENTS BETWEEN VIRTUAL ENVIRONMENTS

FIELD OF THE INVENTION

The present invention generally relates to the production and management of interactive virtual universes presented to users on computers linked by a network and, more particularly, to the automatic management of teleportation movements between locations in virtual environments while determining suitability of requested destinations.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet has also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable. The user is able to control which other participants can see his or her avatar. The avatar often takes the form of a cartoon-like human which can move through the regions of the VU. The VU can be represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft'® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world. However, transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

However, of the variety of environments that may be currently available or foreseeable, many will not be found desirable by a given resident (or person responsible for the resident), resulting in a rapid sequence of teleports to multiple destinations and returns from those destinations. The processing burden required for teleportation is significant while even a brief preview of a destination may be offensive or impractical while the likelihood of finding a desirable destination diminishes as the number of islands and their variety proliferate.

SUMMARY OF THE INVENTION

The present invention provides an automatic filtering of teleport destination characteristics prior to a teleportation which informs a resident or avatar of the suitability of a given teleport destination and/or blocks teleportation to unsuitable destinations. If a given destination is unsuitable, the invention provides suggestions of one or more potentially more suitable alternate sites.

In order to accomplish these and other objects of the invention, a teleportation destination filtering is provided for performing steps of requesting a virtual universe destination, determining characteristics of the virtual universe destination, filtering the characteristics against preferences, characteristics and/or restrictions corresponding to an avatar, and controlling a teleportation operation in accordance with results of the filtering step.

In accordance with another aspect of the invention, a virtual universe system implemented on one or more data processors interconnected by a network is provided comprising an arrangement responsive to a request for teleportation to a virtual universe destination for determining characteristics of the virtual universe destination, a comparator for determining ones of the characteristics of the virtual universe destination which match, mismatch or do not correspond to preferences, characteristics and/or restrictions corresponding to the avatar, and an interface responsive to the comparator for controlling a teleportation operation.

In accordance with a further aspect of the invention, a method of operating a virtual universe system to avoid teleportation of an avatar to a virtual universe destination which is unsuitable for said avatar is provided comprising steps of determining characteristics of the virtual universe destination in response to a teleportation request, comparing preferences, characteristics and restrictions of the avatar to the characteristics of the destination, and, when one or more preferences, characteristics and restrictions of the avatar is mismatched or umnatched, searching the virtual universe based on unmatched metadata of the avatar or the destination.

In accordance with yet another aspect of the invention, a computer program product is provided for performing teleportation of an avatar in a virtual universe comprising a computer readable medium or a communication medium providing signals for causing a digital data processor is provided for performing steps of determining characteristics of the virtual universe destination, filtering the characteristics against at least one of preferences, characteristics and restrictions corresponding to an avatar, and controlling a teleportation operation in accordance with results of the filtering step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
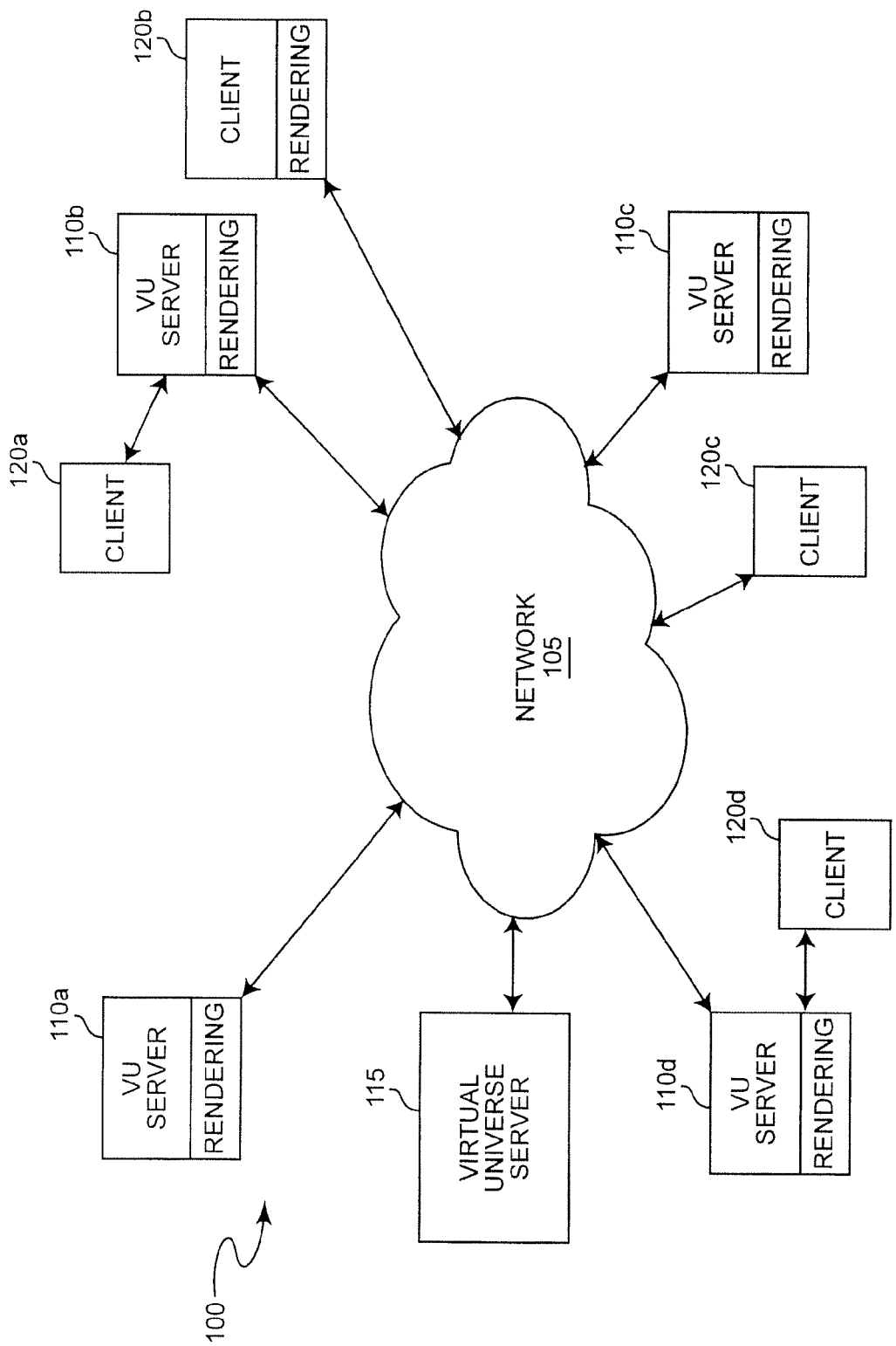
FIG. 1 is a high-level block diagram or data flow diagram of a network-based virtual universe.
Figure 2:
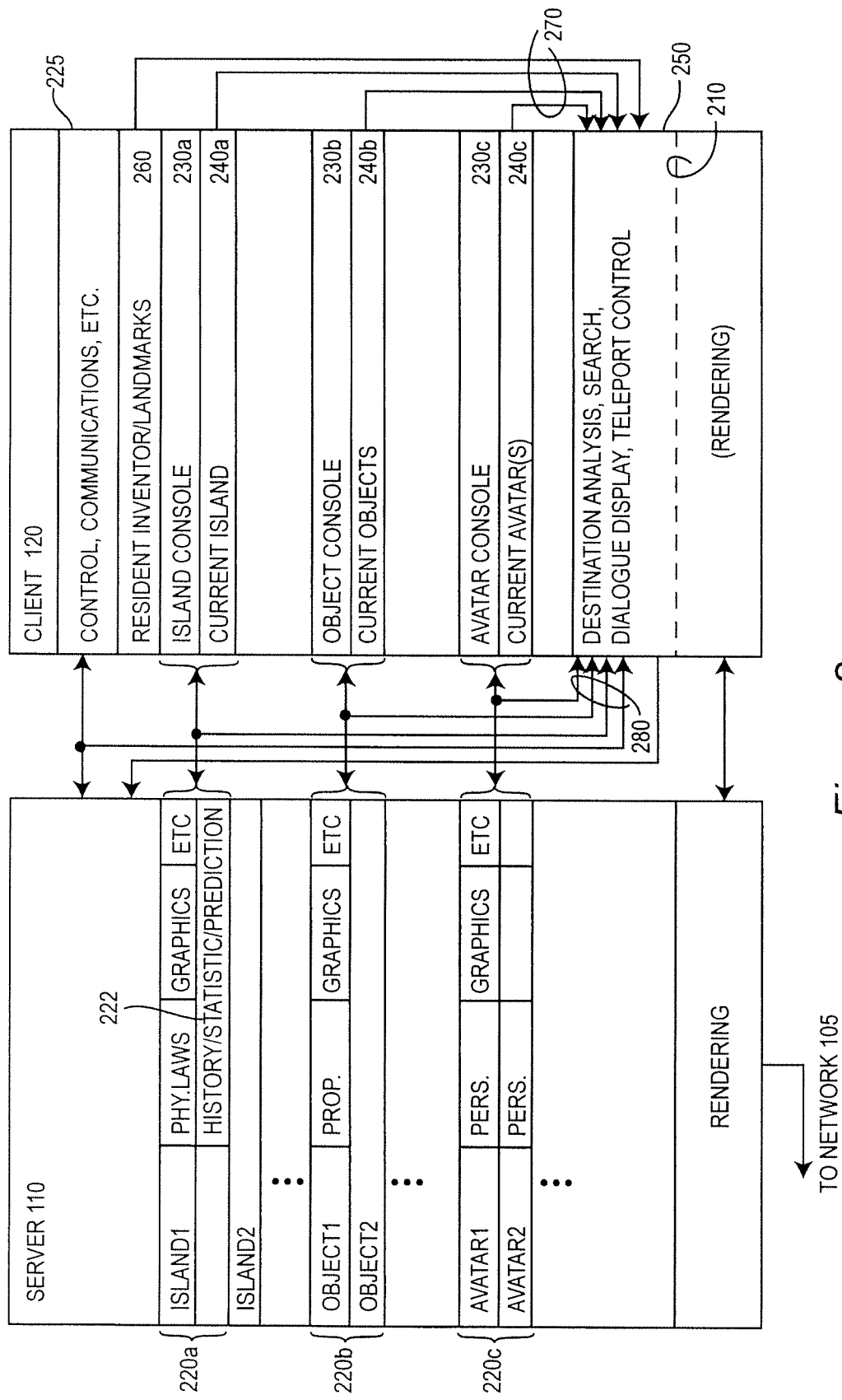
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 6:
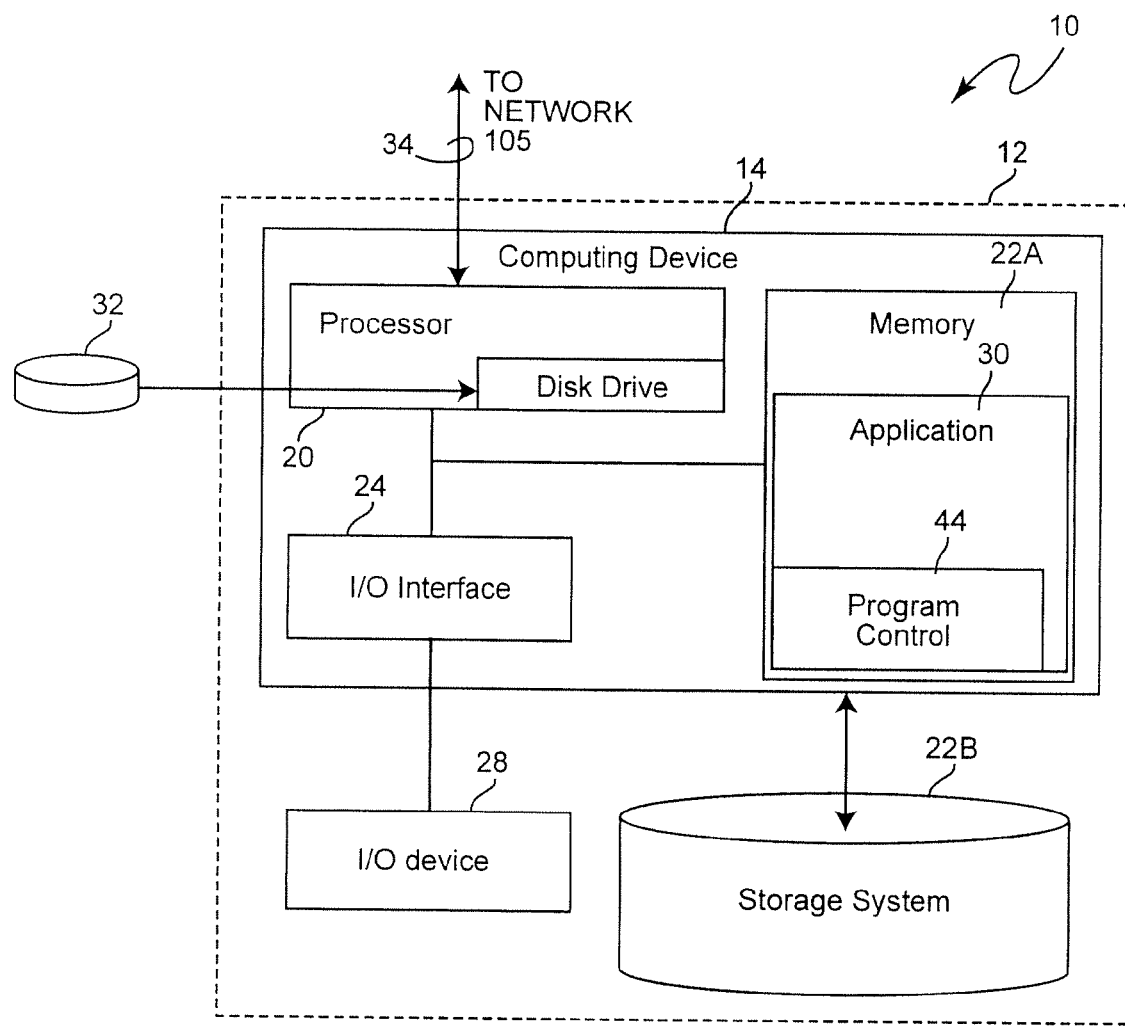
FIG. 6 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 6 and discussed below.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of the rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for the portion of the rendering performed on a server to be done most expeditiously. For example, when a rendering of a scene is required at, say, client 120a for interaction of a particular avatar with an object while changing location on an island, the rendering (including occlusion or hidden line processing) could be performed at the client, local server 110b or distributed over any or all of servers 110a-110d and possibly even including some client terminals (e.g. 120b) having rendering capability depending on rendering complexity (e.g. required image detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor.

In order to create islands, objects and avatars, some arrangement for doing so, preferably a graphic user interface (GUI) which may be in the form of one or more screens (possibly nested) functioning as respective consoles 230a-230c may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220a, 220b and 220c for islands, objects and avatars, respectively. Similar GUIs 240a-240c are also provided (but are preferably resident on the client processor) for control of the current island, object and/or avatar, once it has been created. Suitable arrangements for providing GUIs or consoles 230a-230c and GUIs 240a-240c are known and others providing enhanced user/resident convenience is foreseeable. The current island (220a) with its associated objects (220b) correspond to the current location of the current avatar (220c) and are thus the object of teleportation or relocation to which the present invention is directed for management thereof as will now be discussed.

Some definitions which will be helpful in the following discussion are:

1. Avatar—an avatar is a graphical representation the user/resident selects that others can see, often taking the form of a cartoon-like human but which can be produced with any degree of detail, whether real or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart or even between different virtual universes. As indicated above, a user can teleport to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer.

Data processing intensive rendering is necessarily included within the process of teleporting while teleporting also includes transfer of data from which rendering is performed, such as transmission of personality/behavior descriptors and metadata between servers, arbitration of processing loads among servers, and graphics processing for transmission among severs and to client processors after rendering. Thus, teleportation, while it is occurring, is far more processing intensive than rendering, alone. Therefore, it is desirable that no more teleportation operations than necessary to provide a desirable experience to an avatar and the corresponding resident be performed. Further, a teleport to a location which the avatar/resident immediately finds to be undesirable may involve exposing the resident to images that may be considered harmful and/or have an adverse and possibly lasting psychological effect.

In this regard, as alluded to above, if an avatar teleports to a VU location, it is possible and even likely that the teleport destination may not be found to be desirable for any of a number of reasons such as the presence of other specific avatars, the nature of the environment, activities (or lack thereof) in progress, crowding (as will be discussed below), the aesthetic qualities of graphics or the like. In such a case, a second teleport to the original location of the avatar or to an alternative location will be performed after only a very brief experience of a given destination; increasing the processing burden on the system with little or no benefit to the avatar or resident. Further, it is considered desirable that certain types of teleport locations having certain characteristics such as adult themes or other undesired content be avoided such as by imposing parental controls on teleportation destinations.

Moreover, the processing burden for rendering is increased with increases in the number of avatars which may be present at a given VU location, referred to as "crowding", since each may require a different rendering such as respective points of view for each of a plurality of avatars as well as rendering the avatars themselves, including processing for hidden lines, lighting, shadows, textures, avoidance of co-location of avatars or portions thereof and the like for each avatar and in relation to each other avatar at a given VU location or region. Additionally, the computational burden rises more or less exponentially with the number of avatars at a given VU location and may thus often result in a reduced response time to a point of unacceptability upon the addition of a single avatar to a location.

Further, depending on the environment, the quality of the experience of an avatar and the associated resident may also be adversely affected by crowding. For example, the acceptable avatar population density in a virtual park location would be far less than at a virtual environment (e.g. such as a concert, public meeting or the like) where a substantial degree of crowding would be expected in a corresponding real world counterpart location (where the crowding might, above a given avatar density was reached and certain portions of avatars more or less uniformly occluded by other avatars, might even significantly limit the computational burden of rendering additional avatars i.e. at a density where only a head and shoulders of any avatar would be visible). Therefore, it is desirable that some mechanism, not previously available in virtual universes, be provided to regulate populations of avatars in locations both to provide a suitable experience consonant with the environment and to maintain acceptable response time of the VU system.

In summary, particular teleport destinations may be undesirable for any of a number of reasons, some of which, such as crowding or the presence or absence of specific avatars (or avatars having particular behaviors or characteristics such as so-called griefer avatars which typically behave in a manner to interfere with other avatars) at a location, may change dynamically in more than one aspect such as avatar population densities, identities or behaviors which are contrary to preferences, inappropriate to the environment presented by the destination or which present excessive rendering burden for the available processing power including the inventory of resources available at a resident's processor as indicated, for example, by the resident's inventory (e.g. rendering of some avatars may require substantially more processing than for others). In addition, the availability of needed processing power and data transmission capacity may be compromised by teleports which may be judged unsuitable or undesirable and causing further teleports in an effort to find a more desirable or suitable location and thus causing unnecessary processing burden and potentially compromising performance of the VU system.

To solve these problems simultaneously, the invention provides an augmentation of VU software, as depicted generally at 250 of FIG. 2, to evaluate the suitability, desirability and/or appropriateness of teleport destinations prior to the teleportation operations being performed and, as a perfecting feature thereof which is not necessary to the successful practice of the invention in accordance with its basic principles, to provide suggestions of more suitable, alternate teleport destinations based on existing preferences and conditions as well as some particulars of the teleport operation to a destination reported as unsuitable which an avatar may select or reject. These functions of the invention should not be confused with arrangements to proactively or preemptively choose a teleport destination based on particular criteria an avatar or resident may specify (such as that disclosed in U.S. patent application Ser. No. 12/120,968 entitled "Virtual Universe Teleportation Suggestion Service") or searching arrangements but, rather, to filter characteristics of a specific teleport destination, which has been previously selected, for suitability based on registered preferences and characteristics of a particular avatar (some of which may be permissive while others, such as parental limitations on operations, may be made absolute and/or mandatory and may be referred to hereinafter as restrictions) in addition to the selected teleport destination and, optionally, provide suggestions of alternative teleport destinations which constitute a better match to the same criteria.

In presently known virtual universes, a teleport operation occurs when a user requests to go to a stored landmark or other specified location or region of the VU (possibly as a result of a search or selection from a plurality of suggested locations), is prompted by the VU to go a location or receiving a teleportation invitation from another avatar. Referring again to FIG. 2, it will be recalled from the foregoing that a client processor through which a resident may participate in a VU will generally have information concerning a current avatar and a current environment as well as objects therein either stored or available from a server local thereto, as generally depicted at GUIs 240*a*-240*c*. Similarly a resident's inventory information 260 will be similarly present or available. The resident inventory information may include resident preferences and characteristics including but not limited to available processing hardware/software available to the resident or avatar, objects that may travel with the avatar, particular exclusions of particular types of islands in regard to subject matter, activities, cost and the like, parental restrictions or access codes/passwords, definitions of avatar population densities considered to be "crowded" (which may also be deduced or descriptions adjusted based on previous teleportation history of a given avatar) particular avatars and avatar behaviors to be sought (e.g. friends) or avoided (e.g. griefers), landmarks and the like, some of which information may also be provided from storage 240a-240c as discussed above. This information is collectively illustrated and referred to as criteria 270.

It will also be recalled from the foregoing that a teleport destination may be specified by a resident/avatar or in an invitation. An invitation will generally be accompanied by information such as metadata regarding the destination and its characteristics. In the case of the teleport destination being specified by a resident/avatar, in general, the characteristics of the destination will be stored or otherwise available if, as will generally be the case, the destination has been landmarked. If a destination is not landmarked or is specified by currently desired characteristics, a search of metadata of islands of the VU can be performed and additional characteristics/metadata of returned islands provided from the VU server 115 or other servers participating in the VU over network 105. This information in regard to island characteristics and currently associated objects and avatars, which is collectively indicated by reference numeral 280 is supplied to the destination analysis element 250 provided in accordance with the invention which will now be discussed in connection with FIG. 3A.

Figure 3A:
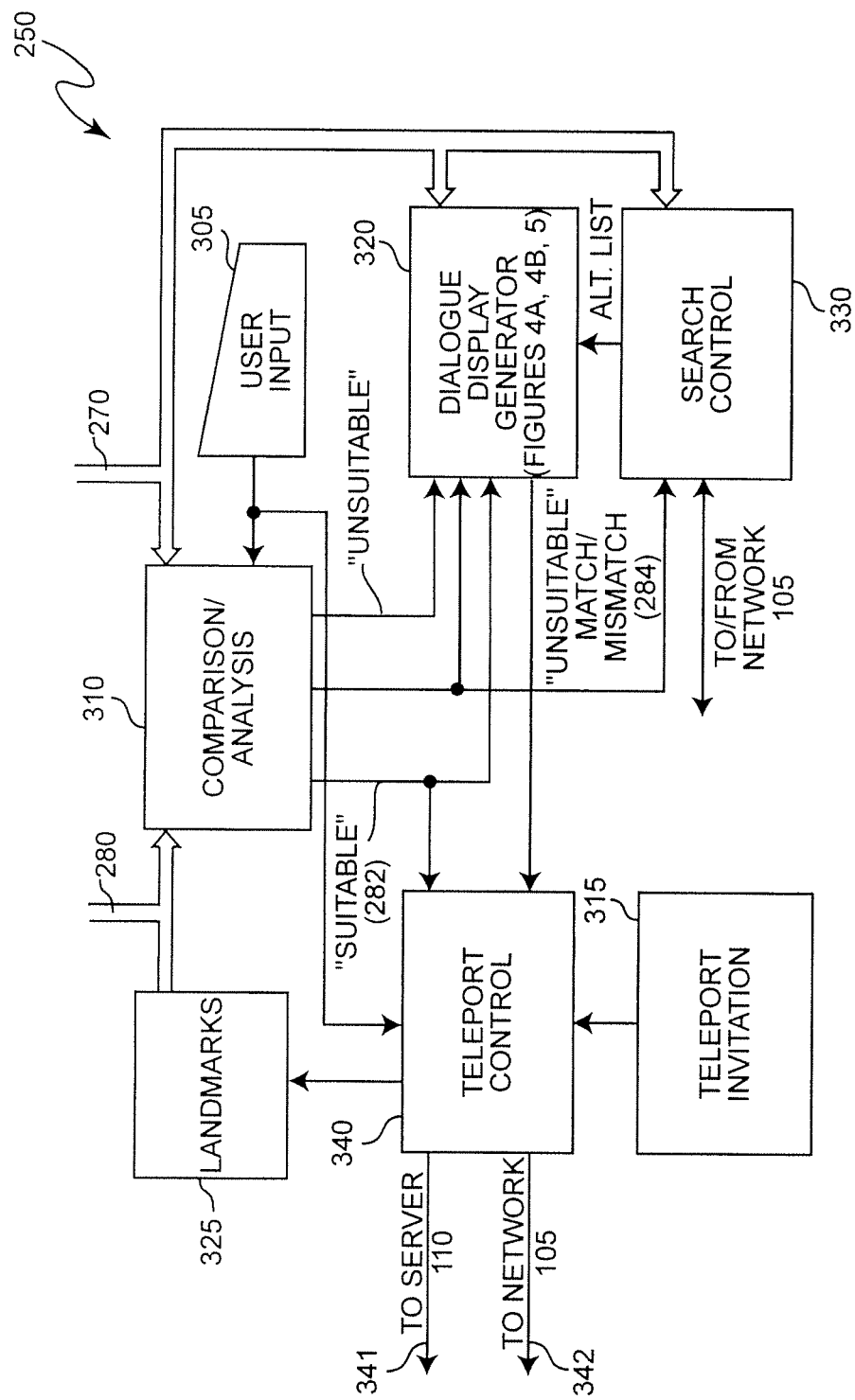
FIG. 3A is a high-level block diagram illustrating a preferred architecture for teleport destination filtering in accordance with the invention.

FIG. 3A is a high-level block diagram of the functional elements and a preferred architecture which are sufficient for successful practice of the invention in accordance with its basic principles. FIG. 3A may also be understood as a flow chart depicting the operation and methodology of the invention as well as a data flow diagram. Principal data input is provided at 270 and 280 as discussed above. Optionally but preferably, user input 305 from, for example, a keyboard or mouse may be provided as well.

When a teleport request is entered at input 305 or a teleport invitation is received as depicted at 315 of FIG. 3, information regarding characteristics of the destination are obtained, preferably under control of the teleport control 340. If the destination is requested and has been landmarked, most of the data 280 regarding characteristics of the destination can generally be retrieved from the corresponding landmark 325, if considered current and reliable. However, it is preferable to obtain data 280 from the VU since ownership or characteristics of a region may have changed since the landmark was created and the region may have acquired undesirable characteristics. Further, data must be fetched from the VU in any case for information concerning current or predicted avatar populations, crowding conditions and processor and network communication loads. Thus, while some data can be more conveniently derived from a landmark, in practical effect, the advantage gained by doing so, if any, is necessarily small and may not yield the desired filtering effect. Acquisition of data from the VU can be obtained from the server 110 over path 341 or the VU server 115 through network 105 over path 342 and returned to the client processor 120 as depicted in FIG. 2.

It is preferred that the various destination characteristic data are provided as tags or other metadata which may be preferably standardized to some degree which, as will be evident from the following discussion, can simplify and facilitate analysis to determine suitability. Tags or metadata such as "This is a shopping mall" or "This area should be restricted to residents over twenty-one years old" are exemplary of terminology which is preferred. To the degree such tags or metadata are standardized in terminology, user preferences and restrictions may be expressed in similar terminology, at least to the extent of key words therein such as "shopping mall" or "twenty-one years" together with Boolean operators or the like which provide verbatim or substantially verbatim matches to portions of tags or metadata regarding destinations. By choosing such terminology, analysis 310 may be reduced to relatively simple text comparisons which may or may not include so-called "fuzzy logic" for detection of differing terminology which is, nevertheless of similar import as is well-understood in the art. In any case, the preferred technique of analysis 310 is basically a repetitive, looping comparison process since the order of tags and/or metadata 280 and the order of preference and restrictions 270 cannot generally be easily made to correspond. That is, each preference and restriction 270 is compared, in turn, with all of the destination characteristic tags or metadata while accumulating the preferences and restrictions for which no match (or, in the case of restrictions, in particular, a direct mismatch) is found.

Figure 3B:
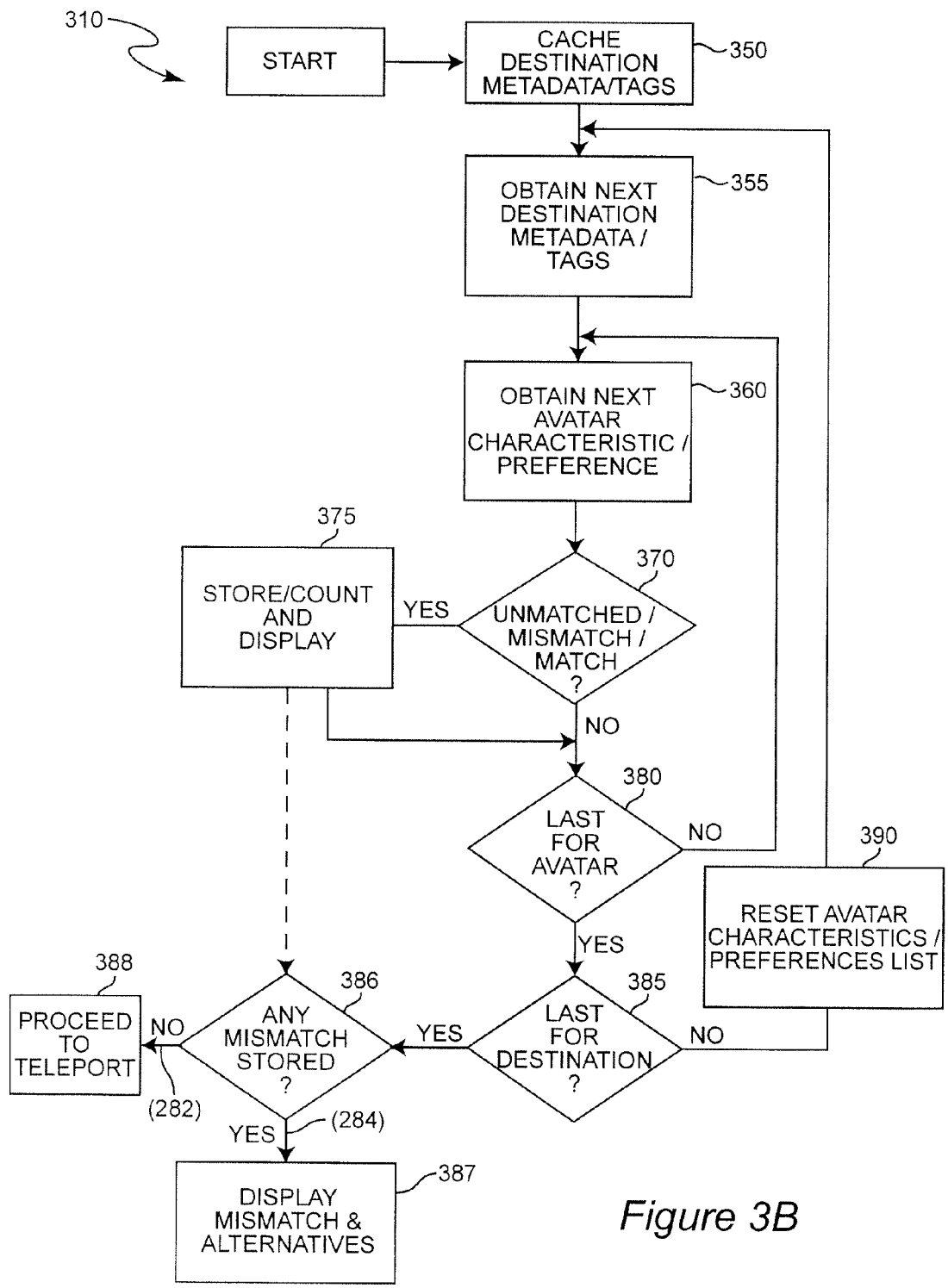
FIG. 3B is an exemplary flow chart for comparing avatar and destination metadata.

Specifically, unless the avatar preferences and characteristics (including restrictions) and destination metadata are in a corresponding order such that a direct attribute-to-attribute comparison can be performed, a process such as that shown in the flow chart of FIG. 3B should generally be used. Specifically, the process is started upon a teleport request being issued. A query to find destination metadata is issued to the VU as discussed above and the metadata is preferably cached locally (350) to avoid a system query for each metadata item or tag. The first metadata item or tag is then obtained (355) and the first avatar characteristic, preference or restriction (hereinafter collectively referred to as an avatar metadata item) is also obtained (360). The first metadata item or tag is then compared against the first avatar metadata item (370) and, unless they are compatible terms, a mismatch is declared and the destination metadata item of tag stored (375). If no mismatch is declared, it is determined if the avatar metadata item is the last. If not, the process loops to 360 and the process is repeated to compare the first destination metadata item or tag against the second/next avatar metadata item and so on. When the last avatar metadata item has been compared against the first destination metadata item as determined at 380, it is determined (385) if the current destination metadata item or tag is the last. If not, the list of avatar metadata items is reset (390) and the process loops to 355, the next destination metadata item or tag is obtained and the process repeated to compare the second/next destination metadata item or tag against all of the avatar metadata items while mismatches are accumulated at 375 and the comparison process preferably re-entered at 380. In this regard, it should be noted that the comparison process need not be re-entered in such a way unless it is desired to be able to override at least some possible mismatches that could exist, in which case, all mismatches should be detected. If such a function is not desired for at least some mismatches such as restrictions, the search and comparison can be immediately terminated with a display of the mismatch and alternative destinations or teleport options (387).

When the last destination metadata item or tag has been compared against all of the avatar metadata items as detected at 385, it is determined at 386 if any mismatches have been declared and stored. If not, the teleport operation can proceed (388). If any mismatches have been declared, it or they are displayed, preferably with teleportation options including cancellation or suitable alternative destinations which may have been established or could be found through an autonomous search for destinations having characteristics similar to those of the requested destination other than those for which a mismatch was declared and which do not have characteristics reflected in metadata that causes other mismatches to be declared. In other words, for suggestion of alternative teleport destinations, a full comparison should be performed for each potential destination to assure that it will not be unsuitable for any specified reason while other unmatched (as distinct from mismatched) metadata from the unsuitable destination can be selectively added as desirable characteristics in choosing a destination to suggest, if desired.

Suitability of a destination may be determined based on a threshold and the number of preferences which are unmatched (e.g. avatar preferences and/or characteristics for which no corresponding destination metadata is found or destination characteristics for which no corresponding avatar preference or characteristic is found and thus neither a match or mismatch can be determined) and/or on the basis of even a single direct mismatch, as may be specified by an avatar/resident. For example, a destination may be deemed unsuitable if its metadata did not match any avatar preferences even though no characteristic indicated as undesirable in the avatar metadata was found.

Figure 4A:
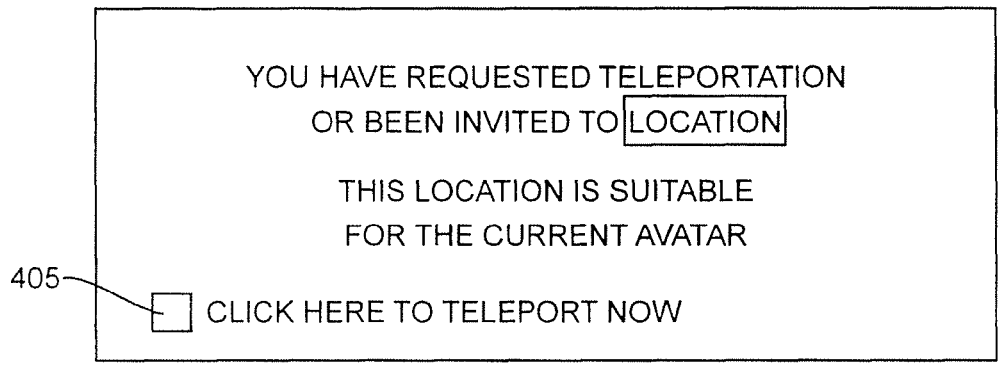
FIGS. 4A, 4B and 5 illustrate exemplary dialogue boxes for display of and communication with and control of the operation of the invention by a user.

The output or result of analysis 310 is schematically depicted, for clarity, as two mutually exclusive outputs labeled (in FIG. 3) as "suitable (282)" and "unsuitable (284)", respectively. When the "suitable" output is enabled or asserted, the teleport destination is transferred to dialogue display control 320 and teleport control 340, whereupon the resident is notified that the destination is determined to be suitable, preferably by a dialogue box similar to that depicted in FIG. 4A which also provides for confirming the destination and initiating a teleport operation by issuing a signal to teleport control 340. In other words, this mode of operation of the invention is similar to the teleport operations of known virtual universes except that the actual teleport operation is delayed and, in effect, intercepted and an analysis is performed, the user/resident notified of the suitability of the teleport and the actual teleport operation is preferably initiated by a further action or confirmation (e.g. 405) of the teleport request.

Figure 4B:
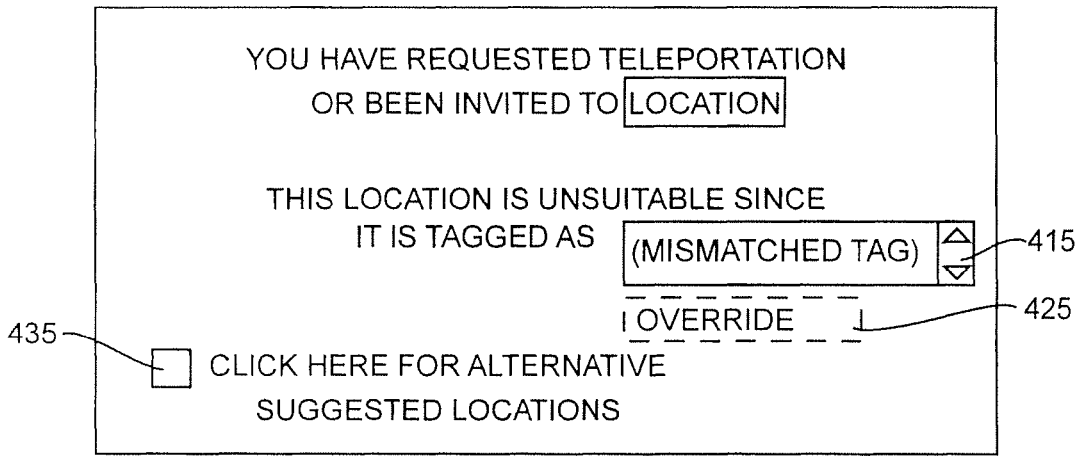

Conversely, if the "unsuitable" output is enabled or asserted, it is preferred that a dialogue box similar to that depicted in FIG. 4B is generated and displayed although other forms of interface for communication to a user/resident may be employed. This dialog box also confirms the requested destination and preferably informs the user/resident of the reason for the "unsuitable" determination, preferably in the form of a scrollable menu as indicated by scroll controls 415.

An "unsuitable" determination and corresponding output is also used to invoke search control 330 to query the VU for other destinations which may avoid the mismatch restriction and/or reduce the number of mismatched preferences which caused the "unsuitable" determination to be issued. Further in regard to the display of FIG. 4B or other display, the user/resident may optionally be provided with a control 425 to override a particular mismatched preference. Such a control would preferably be suppressed in the case of a mismatched restriction.

Figure 5:
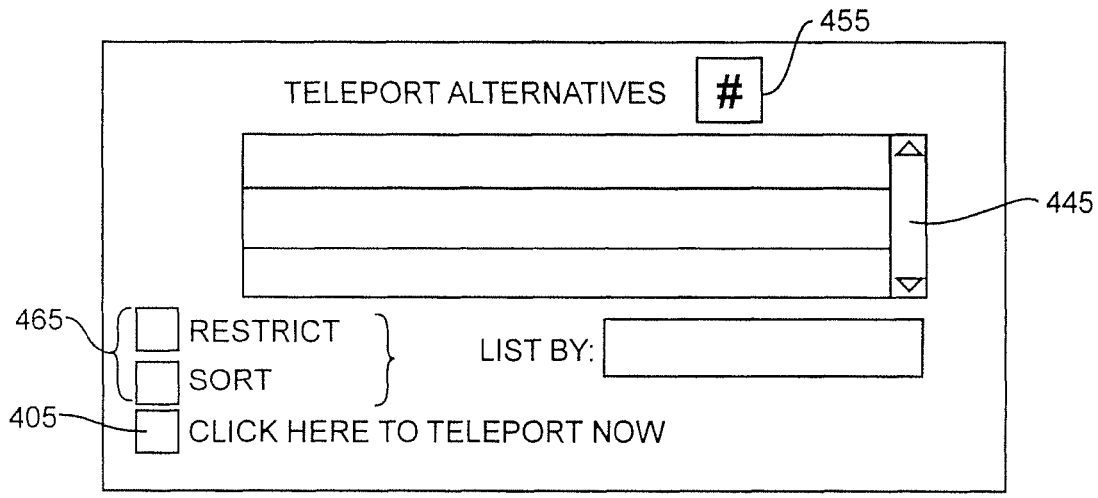

Also, a control 435 for invoking a further determination and display of a list of suggested alternatives or a substituted "suitable" destination can optionally be provided in accordance with a perfecting feature of the invention (which can be provided without a separate dialog box or other display). In general, it is preferred that a simple substitution of an alternate destination which is "suitable" be provided and the invention operated such that if a teleport to a given destination is requested but found unsuitable, teleportation to an alternate, suitable destination is facilitated. However, since proliferation of destinations is foreseeable, increasing the likelihood that there will be more than one suitable, alternative destination, provision of a further dialogue box or screen providing a display 455 of the number of suitable destinations found as well as identifying them, preferably through a scrollable menu 445 as illustrated in FIG. 5 is considered to be within the scope of the present invention. In such an embodiment of the invention, where the number of suitable destinations may be large, it is preferred to provide an additional control 465 for restricting or sorting the list of suitable destinations by entry of additional criteria from input 305 which will serve to reduce the number of alternative destinations suggested. For example, a user resident may wish to restrict the list to destinations with high resolution rendering and sort the list in order of ascending avatar population density even though such restriction and sorting, while likely to be useful in choosing a destination where optimum VU performance may be most likely, may greatly reduce the number of destinations in the list or may even result in a null list if additional restrictions are imposed or if such destinations cannot be accommodated by available processing capacity.

It should be appreciated that while the most basic principle of operation of the invention is to determine the suitability of a requested teleportation destination by filtering characteristics or metadata of the destination against preferences and restrictions for a particular avatar, reading tags or metadata of other locations (either unconditionally or upon a determination that a requested destination is unsuitable) both suitability and alternative suitable destinations can be determined and suggested to a user/resident. For example, if an avatar's profile indicates that the avatar would not like to visit (or may be prohibited from visiting) an "over twenty-one years" site, the requested destination (or preferably its tags or metadata) can be scanned and two tags are found; "over twenty-one years" and "shopping mall". Accordingly the destination is determined to be unsuitable without performing teleport processing or even obtaining a preview of the destination which may, in itself, be offensive. However, using the matching tags or metadata, particularly if standardized as alluded to above, other potential destinations can be scanned using a tag or metadata for which a match was found, other regions of the VU may be searched, shopping malls can be located (e.g. without the user/resident having specified a desire to visit a shopping mall) and a list having at least that similarity to the requested location can be generated and presented to the user/resident. Similarly, if a user criterion is crowdedness and the user has defined (either explicitly or implicitly through the avatar's teleporting history or a combination thereof) "crowded" as being x avatars per square foot for a park, y avatars per square foot for a shopping mall and z avatars per square foot for a rock concert, the requested destination can be scanned for the current avatar population density to determine suitability and, if the requested destination is unsuitable, any other tags or metadata associated with the destination found unsuitable due to crowding may be used to scan other potential destinations for a suitably uncrowded destination (e.g. a rock concert with similar music style that is less well-attended). In this example, it should also be noted that the user need not specify any information in regard to crowdedness that may cause the destination to be determined to be unsuitable. For example, the VU may also provide definitions of crowdedness or specify maximum avatar occupancy for a location or, since different avatars may present different processing burdens for rendering, determine an occupancy based on current system performance or projected performance if the requesting avatar were to be added to the avatar population.

Further in regard to crowdedness or any other criterion desired, it should be noted that one or more metadata items can be generated for a destination based on the history of usage of a destination. That is, additional queries can be made (e.g. based on unmatched avatar metadata items) or statistical information generated automatically that may be predictive of future unsuitability of a destination currently suitable. For instance, a particular destination may be crowded (or processing capacity becomes critical) on Tuesday mornings or regularly visited at another regular time by griefers or an avatar that the current avatar wishes to avoid. Similarly, activities that an avatar may wish to avoid may occur at more or less regular times. Such a destination metadata item may be evaluated relative to the current time and processed as a mismatch or not depending on the amount of time remaining before the destination is predicted to become unsuitable, possibly based to avatar teleportation history regarding length of stay at destinations. Alternatively, the prediction may simply be displayed to a resident that can then choose to teleport or not based upon such information. In any case, provision of such a predictive feature, as depicted at 222 of FIG. 2 is considered to be desirable as tending to avoid teleport operations which may be found, overall, to be unsatisfactory or may be likely to result in a less than satisfactory YU experience.

Similar modes of operation may be based on actual or suggested current system conditions can be applied to requested destinations that may be offensive or uninteresting. For example, based on time spent by an avatar at other teleportation destinations, conditions which are likely to cause offense or be uninteresting to a given avatar may be deduced or adaptively determined. For example, tags or metadata indicating certain characteristics of destinations which an avatar has a history of visiting for only short periods of time may be readily compared for consistency with other destinations visited for longer periods by the avatar in order to deduce conditions which the avatar may but need not specify that may have led to early termination of previous teleports such that mismatches can be declared for some tags or metadata which are likely to indicate unsuitability for teleportation for a particular avatar as being offensive or unsuitable. It is even possible to discriminate between destinations which are offensive and those which are merely uninteresting from the history of previous avatar teleports and different thresholds applied accordingly for determining "unsuitability".

In view of the foregoing, it is seen that the invention provides for filtering of a requested teleport destination against user preferences, characteristics, restrictions and the like as well as system operational parameters to determine, prior to a teleportation operation, whether or not a selected destination is suitable for a given avatar. The conditions and characteristics of destinations may be either static, as reflected in tags or metadata, dynamic, such as current avatar occupancy (e.g. population density or the presence of particular avatars or groups thereof and their current activities or predictive, based on destination usage history and/or avatar teleportation history statistics. Thus, teleportation operations which are unlikely to be desirable and which will likely result in a further teleportation for return of an avatar to an original location as well as previews of destinations which may be offensive may be avoided. As perfecting features of the invention, a list of alternative destinations which are suitable for the avatar may be provided based on and the search process simplified and accelerated by results of the filtering process. As a further perfecting feature of the invention, the list of suitable alternative destinations may be further restricted by additional criteria at the will of the operator to facilitate selection of and teleportation to an optimally desirable destination in an easily controlled and intuitive manner.

While shown and described herein as a method and a system, it is understood that the invention further provides various alternative embodiments. For example, in one embodiment shown in FIG. 6, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. Apparatus for operating a virtual universe system on a plurality of networked data processors to provide a service, said apparatus comprising at least one data processor of said plurality of data processors that is configured to provide means responsive to a request for teleportation to a virtual universe destination for determining characteristics of said virtual universe destination, said virtual universe destination being one of a plurality of locations in one or more virtual universes;

a comparator for determining ones of said characteristics of said virtual universe destination which match, mismatch or do not correspond to at least one of: preferences, characteristics and restrictions corresponding to an avatar;

a search control for searching when one or more of said preferences, characteristics and restrictions of said avatar is mismatched or unmatched, said search control searching said virtual universe based on unmatched metadata of said avatar or said virtual universe destination for alternative teleportation destinations corresponding to at least one of avatar preferences or characteristics, for which a match is found; and an interface responsive to said comparator for controlling a teleportation operation, wherein when said virtual universe destination requested for teleportation is found to be unsuitable, the interface indicates that said virtual universe destination was found unsuitable for said avatar by said comparator based on said preferences, characteristics and restrictions which are unmatched or mismatched while delaying, altering or canceling said teleportation operation, and displays and provides for acceptance of an alternative teleportation destination found by the search control.

2. The apparatus as recited in claim 1, wherein said characteristics of said virtual universe destination are expressed as tags.

3. The apparatus as recited in claim 1, wherein said controlling a teleportation operation includes substitution of an alternative teleportation destination.

4. The apparatus as recited in claim 1, wherein said controlling a teleportation operation includes conducting a search for one or more suitable alternative teleportation destinations.

5. The apparatus as recited in claim 1, wherein at least one of said characteristics of said virtual universe destination is based on current occupancy in numbers of avatars at said virtual universe destination or processing capacity available for rendering said virtual universe destination.

6. The apparatus as recited in claim 1, wherein at least one of said characteristics of said virtual universe destination is based on historical usage of said destination or a location having similar characteristics.

7. The apparatus as recited in claim 1, wherein at least one of said characteristics of an avatar is adaptively determined.

\* \* \* \* \*